(12) United States Patent
Saito et al.

(10) Patent No.: US 8,409,021 B2
(45) Date of Patent: Apr. 2, 2013

(54) METHOD FOR MANUFACTURING FITTING INCLUDING BLIND NUT AND TAP TOOL FOR USE IN THIS METHOD

(75) Inventors: Hirofumi Saito, Chula Vista, CA (US); Kazuhiko Okagami, Chula Vista, CA (US)

(73) Assignee: Iwai Metal (America) Co., Ltd., Chula Vista, CA (US)

( * ) Notice: Subject to any disclaimer, the term of this patent is extended or adjusted under 35 U.S.C. 154(b) by 597 days.

(21) Appl. No.: 12/590,674

(22) Filed: Nov. 12, 2009

(65) Prior Publication Data

US 2011/0111868 A1    May 12, 2011

(51) Int. Cl.
*B21K 1/44* (2006.01)
*B21K 1/64* (2006.01)
*B21D 53/24* (2006.01)
*B21H 3/10* (2006.01)
*B21J 13/02* (2006.01)

(52) U.S. Cl. ............. 470/25; 470/105; 470/96; 470/199

(58) Field of Classification Search ............. 470/18, 470/20, 25, 26, 87, 89, 91, 96, 105, 109, 470/199, 204, 198; 72/55, 370.27, 70–71
See application file for complete search history.

(56) References Cited

U.S. PATENT DOCUMENTS

| 3,006,003 A | * | 10/1961 | Johnson, Jr. | 470/25 |
| 5,678,962 A | * | 10/1997 | Hyatt et al. | 470/199 |

FOREIGN PATENT DOCUMENTS

| JP | 2002-321528 | 11/2002 |
| JP | 2004-154802 | 6/2004 |

* cited by examiner

*Primary Examiner* — Dana Ross
*Assistant Examiner* — Mohammad I Yusuf
(74) *Attorney, Agent, or Firm* — DLA Piper LLP (US)

(57) ABSTRACT

The present invention provides a method for manufacturing a fitting that has a configuration where a fitting plate and a blind nut are integrally formed and also provides a tap tool for use in this method. According to the present invention, performing tap processing to an internal diameter portion to integrally form a portion corresponding to the blind nut, when a tap tool having a protrusion at an end thereof is utilized to be inserted into the bag-like blind hole at a planned part of the blind nut and the tap processing is carried out, the protrusion provided at the end of the tap tool comes into contact with an inner wall at the end of the bag-like blind hole, and a pressed material thereby forms a convex shape on an outer side of the bag-like blind hole.

3 Claims, 14 Drawing Sheets

METHOD FOR MANUFACTURING FITTING INCLUDING BLIND NUT AND TAP TOOL FOR USE IN THIS METHOD

BACKGROUND OF THE INVENTION

1. Field of the Invention

The present invention relates to a method for manufacturing a fitting including a blind nut that is, e.g., a fitting for hanging a TV main body on a wall and to a tap tool for use in this method.

2. Description of the Related Art

As a fitting for hanging a TV main body on a wall, there is a fitting including a blind nut. This fitting is formed by integrally coupling a portion that is a fitting plate 1 with the other portion that is a blind nut 2 as shown in FIG. 7. A screw fastening hole 1b is formed in the fitting plate 1, and a plastic cover provided on a rear side of a flat-screen TV is screwed from an inner side. This plastic cover has a hole, the blind nut 2 is placed in this hole, and the blind nut 2 is screwed when hanging the TV on the wall by using a screw. The blind nut 2 is adopted because screwing can be effected on a bottom of the blind nut even if a final user uses a screw that is long more than necessity.

The fitting plate 1 has a board thickness of 0.5 to 4.0 mm, has an electrogalvanized steel sheet (SECC) or the like as a material, is subjected to processing (bending and boring) by a pressing machine having a die in advance, and has an insertion hole la for the blind nut 2 formed in a flat plate portion thereof.

As shown in FIG. 6, the blind nut 2 of M6 is inserted into the insertion hole la formed in the fitting plate 1, and caulked and fixed (fastened and firmly attached) by using a pressing machine to be provided as a product.

A cost of the blind nut 2 is high, and it accounts for a substantial fraction of a total cost.

Thus, a method for integrally forming the blind nut 2 from the fitting plate 1 has been examined. According to this method, a portion corresponding to the fitting plate 1 is formed into an embossed shape by drawing processing, and an internal diameter portion is subjected to tap processing to integrally form the portion corresponding to the blind nut 2.

Meanwhile, for the purpose of reducing the number of components, a technology that performs burring processing (drawing processing effected by the pressing machine) with respect to a bracket and carries out thread cutting processing (tapping) with respect to an inner periphery of the thus formed cylindrical portion to integrally form a female screw that substitutes for a nut with the bracket has been proposed, and there are the following patent documents which have been filed and disclosed in Japan.
[Application Number] Japanese Patent Application No. 2002-321528
[Publication Number] Japanese Patent Application Laid-open No. 2004-154802

This is, as shown in FIG. 8, a method for forming an integral female screw portion in a press molded article by which a panel material 110 is subjected to press working to form the female screw portion integrated with this panel material 110, and a cylindrical portion 111 formed by performing drawing processing with respect to the panel material 110 is repeatedly subjected to compression processing in each of a radial direction and a height direction thereof to increase a wall thickness of the cylindrical portion 111, and then thread cutting is effected with respect to an inner periphery of this cylindrical portion 111.

It is to be noted that the wall thickness of the cylindrical portion constituting the female screw portion is equal to a board thickness of a bracket or it is smaller than the board thickness of the bracket depending on a drawing depth at the time of burring processing, whereby strength of the female screw portion is lowered to degrade fastening power. As a measure for an increase in cost and weight which occurs when the board thickness of the bracket is increased to assure the strength of the female screw portion, repeating the compression processing along each of the radial direction and the height direction of the cylindrical portion formed by effecting drawing processing to the panel material to increase the wall thickness of the cylindrical portion and then carrying out the thread cutting with respect to the inner periphery of this cylindrical portion has been proposed.

FIGS. 9 to 14 show manufacturing processes. As shown in FIGS. 9 and 10, a draw portion in a workpiece shape is determined as a cylindrical portion 111 having a bottom. An angle of each corner in a draw end portion 111a and a root portion 111b of the cylindrical portion 111 is substantially set to a right angle. As a result, buckling or material slipping of the cylindrical portion 111 caused due to the compression processing can be avoided. Forming this cylindrical portion 111 by the single drawing processing is ideal, but it is impossible in practice, and hence the processing is carried out at a plurality of steps.

As shown in FIG. 11, a bottom plate of the draw end portion 111a in the cylindrical portion 111 is punched out, the cylindrical portion 111 having this workpiece shape is compressed along each of a radial direction and a height direction (a draw depth direction) thereof, and each corner portion in the root portion 111b of the cylindrical portion 111 is determined by this processing.

As shown in FIG. 12, the compression forming is carried out, the cylindrical portion 111 is further compressed in the radial direction and the height direction, and the wall thickness of the cylindrical portion 111 is increased.

As shown in FIG. 13, the compression processing is further carried out, the cylindrical portion 111 is thereby further compressed, and it is processed into a shape optimum for thread cutting processing (tapping) as a subsequent process, and a product having a screw portion 111c formed on an inner hole of the cylindrical portion 111 can be obtained as shown in FIG. 14.

As described above, when the wall thickness of the cylindrical portion 111 is increased and then the screw portion 111c is processed to form the female screw portion, strength of the female screw portion can be enhanced without increasing the board thickness of the panel material 110. Further, in the compression processing for increasing the wall thickness of the cylindrical portion 111, when the root portion 111 of the cylindrical portion 111 is formed into a tapered shape as depicted in FIG. 13, the strength of the female screw portion that is finally formed can be further improved.

Moreover, U.S. Pat. No. 5,503,596 "METHOD OF MANUFACTURING TEE NUTS" by Yutaka Nagayama and Japanese Applications [Japanese Patent Application No. 112641-1993] (Publication No. 323315-1994) and [Japanese Patent Application No. 268820-1993] (Japanese Patent Application Laid-open No. 116769-1995) likewise disclose a T-nut 1 that includes a shaft portion and a flange portion which are formed of an integral metal material, the flange portion outwardly protruding from a first end portion of this shaft portion, the shaft portion having a hollow cylindrical shape, a female screw being formed on an entire inner peripheral surface of the shaft portion.

It is to be noted that, in this patent document, a wall thickness of a cylindrical portion constituting the female screw portion is equal to a board thickness of a bracket, or it is smaller than the board thickness of the bracket depending on a draw depth at the time of burring processing, whereby the female screw portion has low strength and poor fastening power. As a measure for an increase in cost and weight which occurs when the board thickness of the bracket is increased to assure the strength of the female screw portion, repeating the compression processing along each of a radial direction and a height direction of the cylindrical portion formed by effecting drawing processing to a panel material to increase the wall thickness of the cylindrical portion and then carrying out a thread cutting processing with respect to the inner periphery of this cylindrical portion has been proposed.

Meanwhile, when these schemes are applied to manufacture of the above-described fitting for hanging a TV main body, the blind nut 2 is formed into an embossed shape by drawing processing, and an internal diameter portion thereof is tapped to be formed.

Therefore, whether the tap processing has been carried out can be judged by visually confirming a portion near a bag-like inlet portion of a product, but an inspection for a depth of tap processing cannot be visually conducted. Therefore, a screw gauge or a screw must be screwed into a product, and a difference in length of the screw gauge or the screw at this moment must be measured to determine a processing depth.

This method takes time since the gauges are put into products one by one for the determination, and it is unsuitable for determining many products.

In view of the above-described drawbacks, it is an object of the present invention to provide a method for manufacturing a fitting including a blind nut that enables visually confirming whether the tap processing has been effected from the outer side and also provide a tap tool for use in this method.

SUMMARY OF THE INVENTION

To achieve this object, the present invention according to claim 1 provides a method for manufacturing a fitting including a blind nut that has a configuration where a fitting plate and a blind nut are integrally formed, wherein, in case of forming a part of a plate material serving as the fitting plate into a bag-like blind hole by drawing processing and performing tap processing to an internal diameter portion to integrally form a portion corresponding to the blind nut, when a tap tool having a protrusion at an end thereof is utilized to be inserted into the bag-like blind hole at a planned part of the blind nut and the tap processing is carried out, the protrusion provided at the end of the tap tool comes into contact with an inner wall at the end of the bag-like blind hole, and a pressed material thereby forms a convex shape on an outer side of the bag-like blind hole.

According to the present invention set forth in claim 1, whether the tap processing has been carried out even at the inner part can be easily judged by visually confirming that the convex shape is formed on the outer side of the bag-like blind hole.

According to the present invention set forth in claim 2, there is provided a tap tool for use in the manufacturing method according to claim 1, wherein a protrusion is formed at an end thereof to form a convex shape in a product.

According to the present invention set forth in claim 2, since the small protrusion is set at the end of the tap tool, when this tap tool is inserted into the bag-like blind hole at a planned part of the blind nut to carry out the tap processing, the protrusion at the end of the tap tool comes into contact with an inner wall of the end of the bag-like blind hole, and a pressed material forms the convex shape on the outer side of the bag-like blind hole.

According to the present invention set forth in claim 3, a protrusion having a diameter smaller than a diameter of a tap processing portion is formed at an end of the tap processing portion of a tap main body formed of a shank portion and the tap processing portion so as to protrude in an axial direction.

According to the present invention set forth in claim 3, the protrusion is provided at the end of the tap processing portion of the tap main body formed of the shank portion and the tap processing portion so as to protrude in the axial direction of the tap main body, the axial direction corresponds to the center, and the protrusion is placed at the center of the end. Therefore, the central point rotates even if the protrusion rotates with the rotation of the tap main body, and hence the protrusion is not eccentrically largely swung to be rotated. When the protrusion comes into contact with the inner wall of the end of the bag-like blind hole to form the convex shape on the outer side of the bag-like blind hole, the protrusion having a minimum size can suffice, and it does not function as an obstruction.

DETAILED DESCRIPTION OF THE PREFERRED EMBODIMENT

Figure 2:
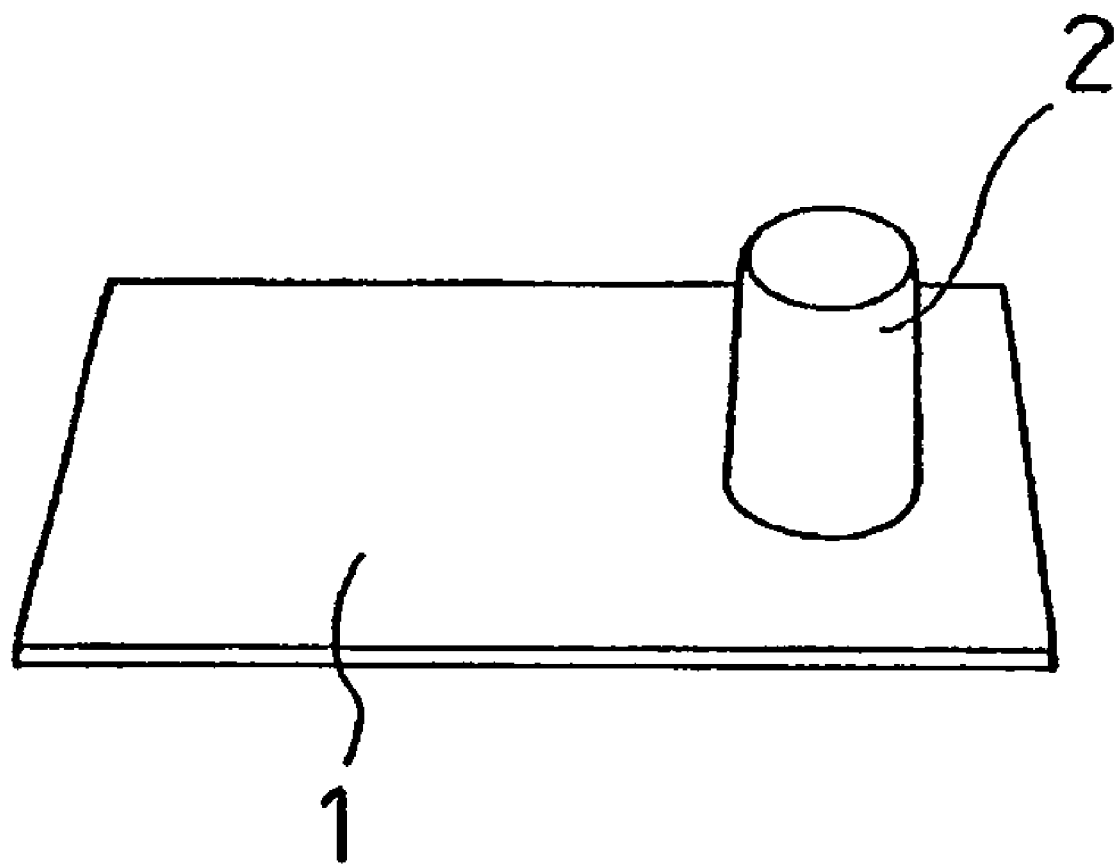
FIG. 2 is a perspective view of a manufacturing method intermediate product obtained by the method for manufacturing a fitting including a blind nut according to the present invention.

An embodiment according to the present invention will now be described hereinafter. As shown in FIG. 2, a portion that becomes a fitting plate 1 and a portion that becomes a blind nut 2 are integrally formed. To realize this configuration, a part of the fitting plate 1 is formed into an embossed shape by drawing processing, and an internal diameter portion of the same is subjected to tap processing to form the portion corresponding to the blind nut 2.

Figure 3:
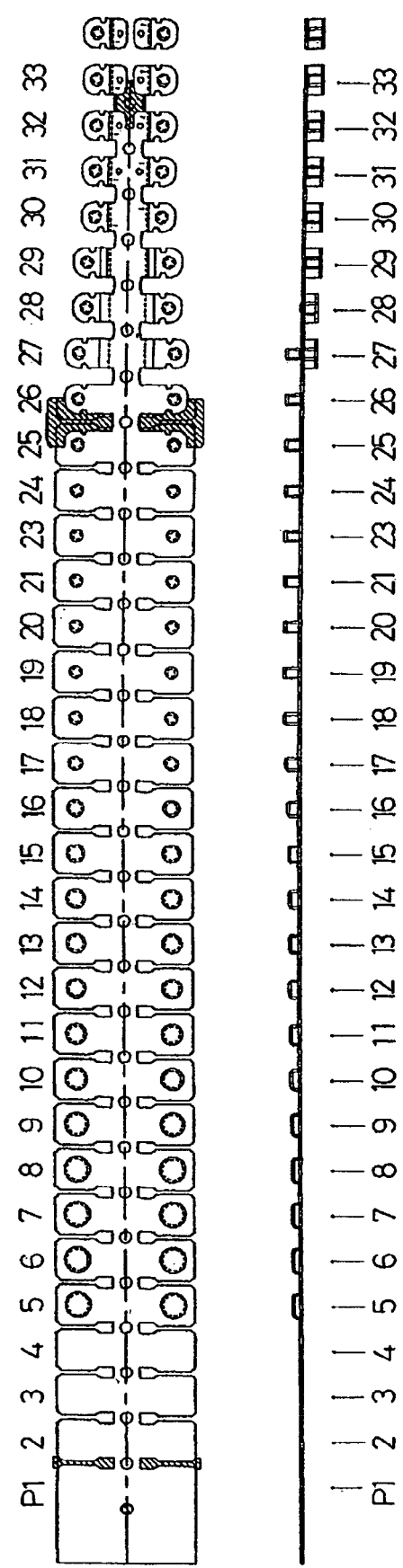
FIG. 3 is an explanatory view showing a forming process in the method for manufacturing a fitting including a blind nut according to the present invention.

FIG. 3 is an explanatory view showing a forming process in a method for manufacturing a fitting including a blind nut according to the present invention in relation to a plan view and a cross-sectional view. In these drawings, consecutive numbers P1 to P33 written in accordance with respective processes represent process numbers.

P1 . . . piercing, P2 . . . notching, P3 . . . idle, P4 . . . idle, P5 . . . drawing 1, P6 . . . idle, P7 . . . idle, P8 . . . idle, P9 . . . drawing 2, P10 . . . drawing 3, P11 . . . drawing 4, P12 . . . drawing 5, P13 . . . idle, P14 . . . idle, P15 . . . drawing 6, P16 . . . drawing 7, P17 . . . drawing 8, P18 . . . drawing 9, P19 . . . drawing 10, P20 . . . idle, P21 . . . idle, P23 . . . idle, P24 . . . idle, P25 . . . idle, P26 . . . notching, P27 . . . Z bending, P28 . . . idle, P29 . . . rough bending, P30 . . . engraving, P31 . . . piercing, P32 . . . cutting, P33 . . . carrying out It is to be noted that a strip-like steel sheet is used as a panel material that is a press molding target in this embodiment. Further, processed goods (which will be also referred to as workpieces hereinafter) in respective processes are connected with each other without being separated during processing.

As the panel material, an electrogalvanized steel sheet (SECC) having a board thickness of 0.5 to 4.0 mm, e.g., a board thickness of 1.6 mm is utilized.

The processes P1 and P2 depicted in FIG. 3 are workpiece outline trimming processes. The processes P3 and P4 are idle sections for feeding an oil or separating a mold, and no problem occurs even if these processes are not provided.

The processes P5 to P19 depicted in FIG. 3 are drawing processes for integrally forming the portion that becomes the fitting plate 1 and the portion that becomes the blind nut 2. It is to be noted that the subsequent processing including the drawing processing is carried out at two positions with respect to a single workpiece.

Although using the single drawing processing to form the draw portion required to form the portion corresponding to the blind nut 2 in the workpiece shape into the embossed shape (a bag-like blind hole 14) is ideal, it is actually impossible, and hence the draw portion is processed in several processes.

Forming a root portion 14b of the bag-like blind hole 14 into a tapered shape enables suppressing a thickness and increasing strength.

Figure 1:
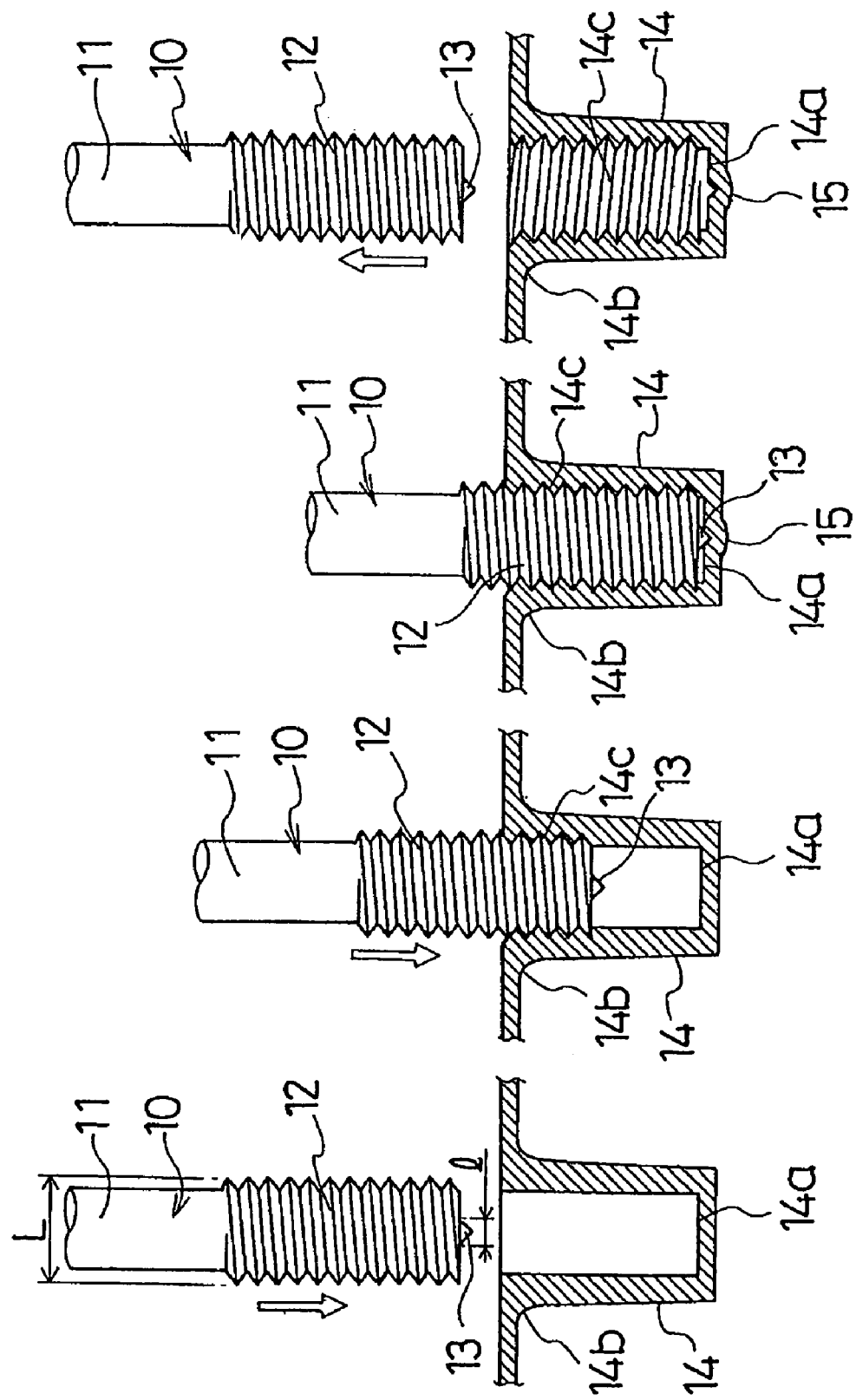
FIG. 1 is a process explanatory view showing an embodiment of a method for manufacturing a fitting including a blind nut according to the present invention.

Each process depicted in FIG. 1 is a thread cutting process with respect to an inner hole of the bag-like blind hole 14.

Figure 4:
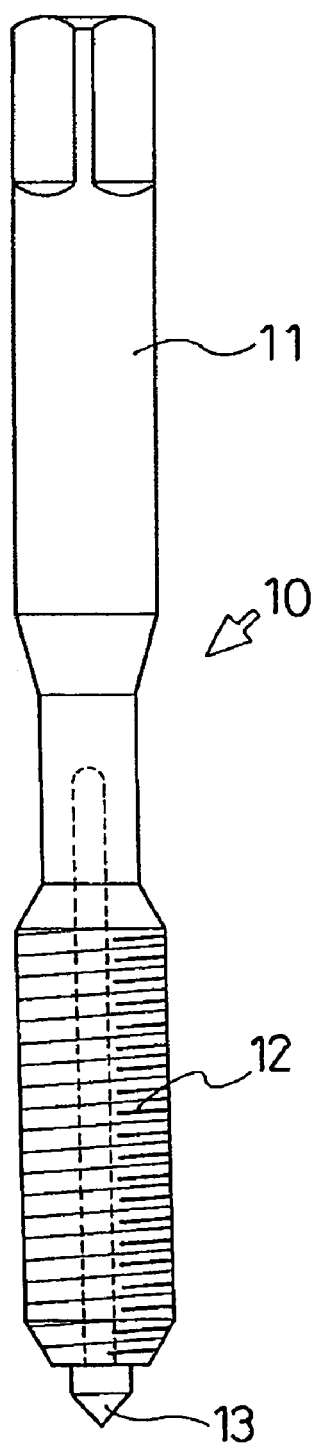
FIG. 4 is a front view showing an example of a tap tool utilized in the manufacture of the fitting including the blind nut.
Figure 5:
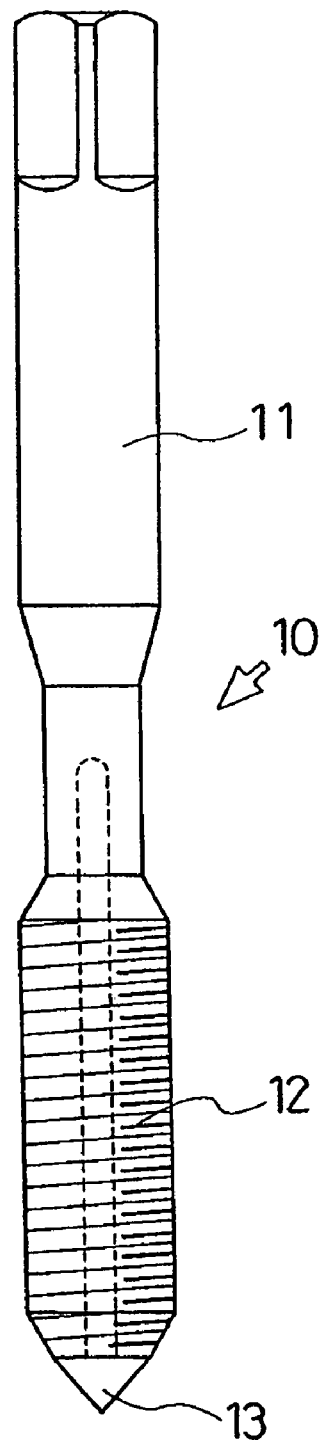
FIG. 5 is a front view showing another example of the tap tool for use in the manufacture of the fitting including the blind nut.
Figure 6:
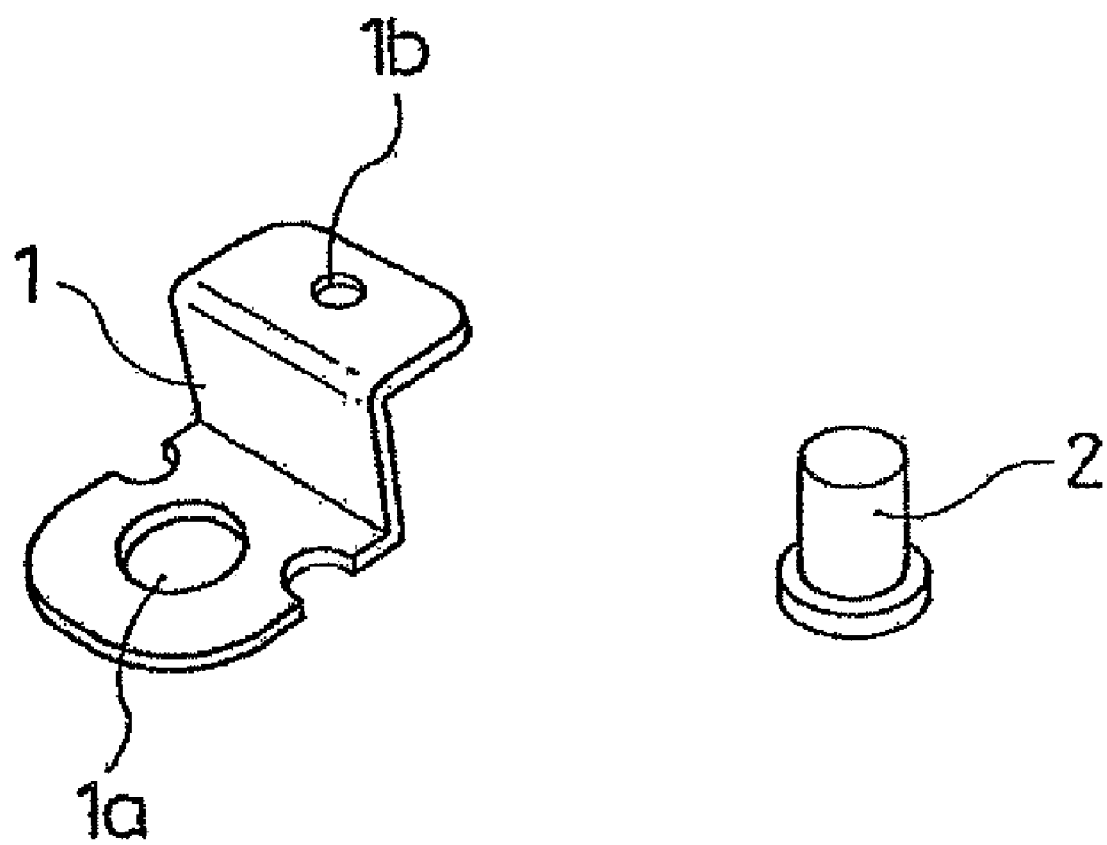
FIG. 6 is an exploded perspective view of a conventional fitting for hanging a TV main body on a wall.
Figure 7:
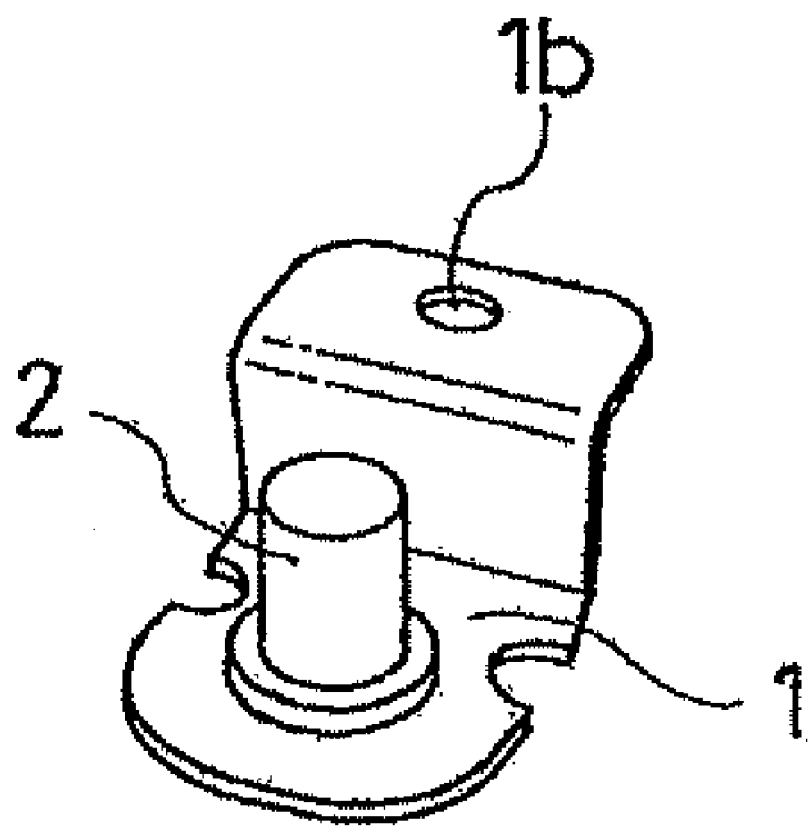
FIG. 7 is a perspective view of a final product of the conventional fitting for hanging a TV main body on a wall.
Figure 8:
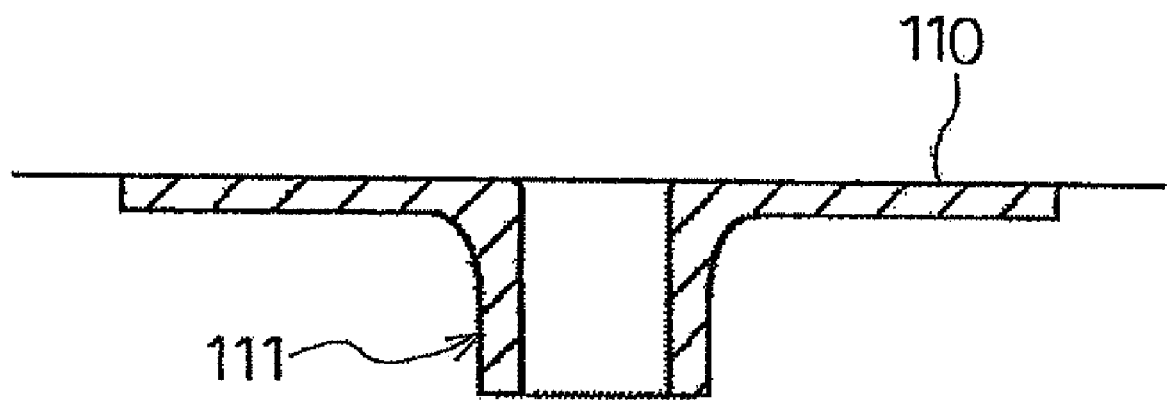
FIG. 8 is a cross-sectional view of the shape forming of an integral female screw portion in a press molded article.
Figure 9:
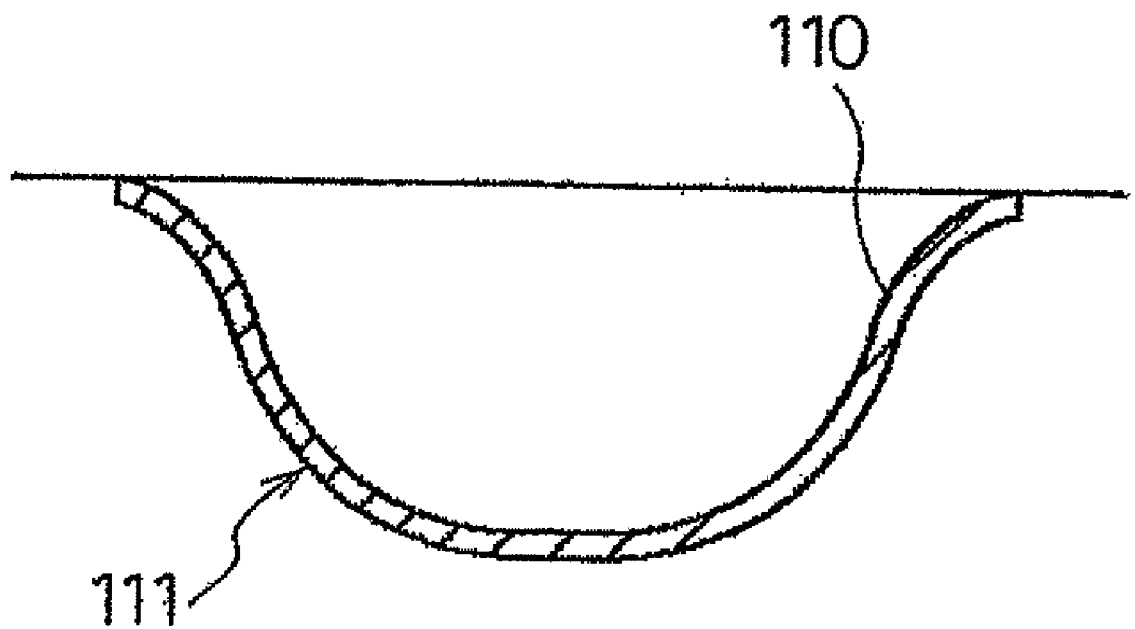
FIG. 9 is a cross-sectional view showing a workpiece shape processed at a first step in drawing processing.
Figure 10:
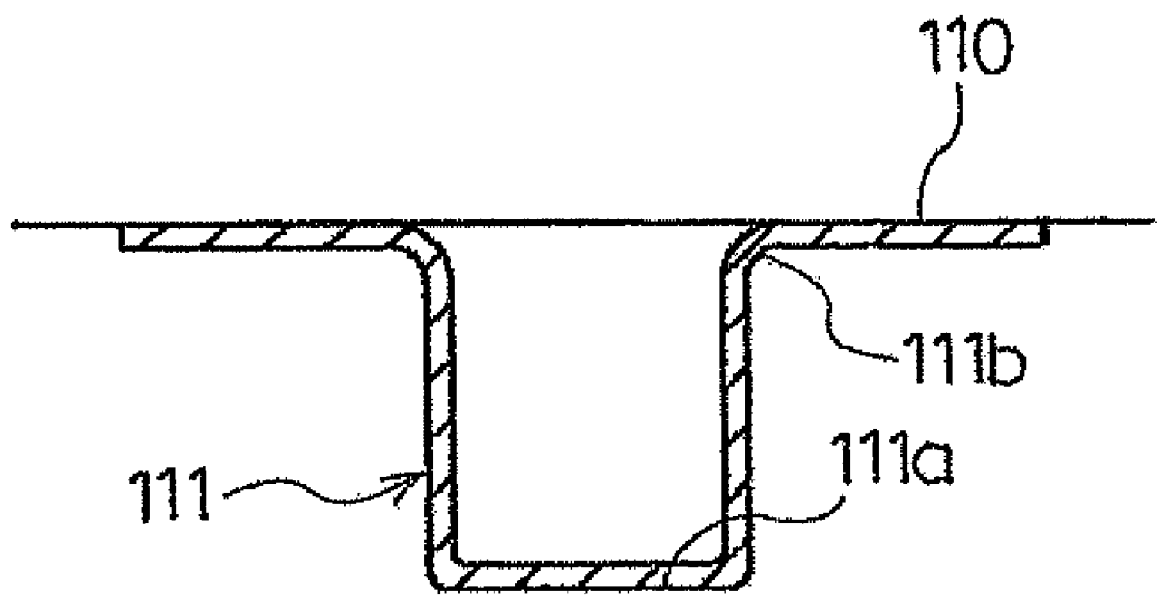
FIG. 10 is a cross-sectional view showing a workpiece shape processed at a last step in the drawing processing.
Figure 11:
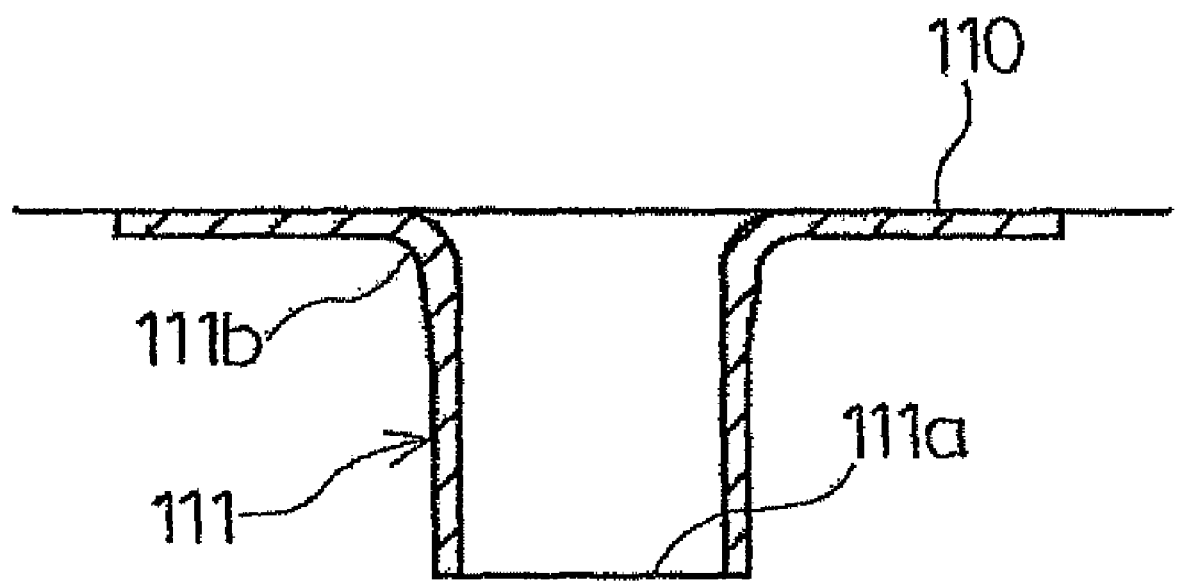
FIG. 11 is a cross-sectional view showing a workpiece shape processed at a first step in compression processing.
Figure 12:
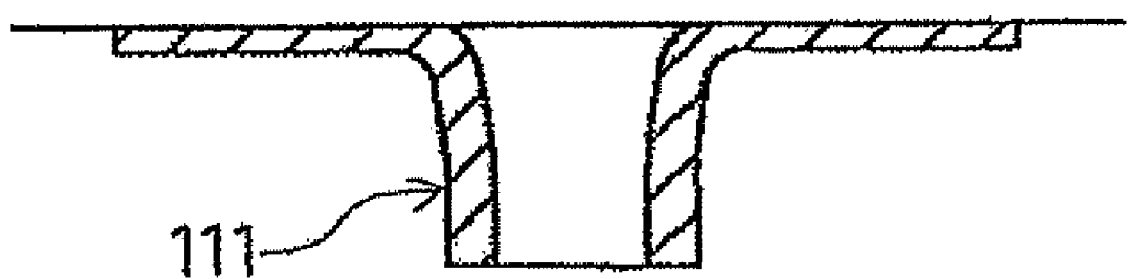
FIG. 12 is a cross-sectional view showing a workpiece shape after a thickening process in the compression processing.
Figure 13:
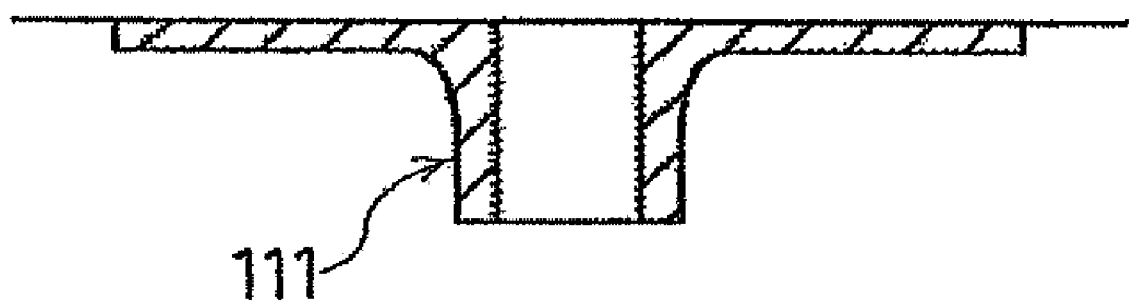
FIG. 13 is a cross-sectional view showing a workpiece shape processed at a last step in the compression processing.
Figure 14:
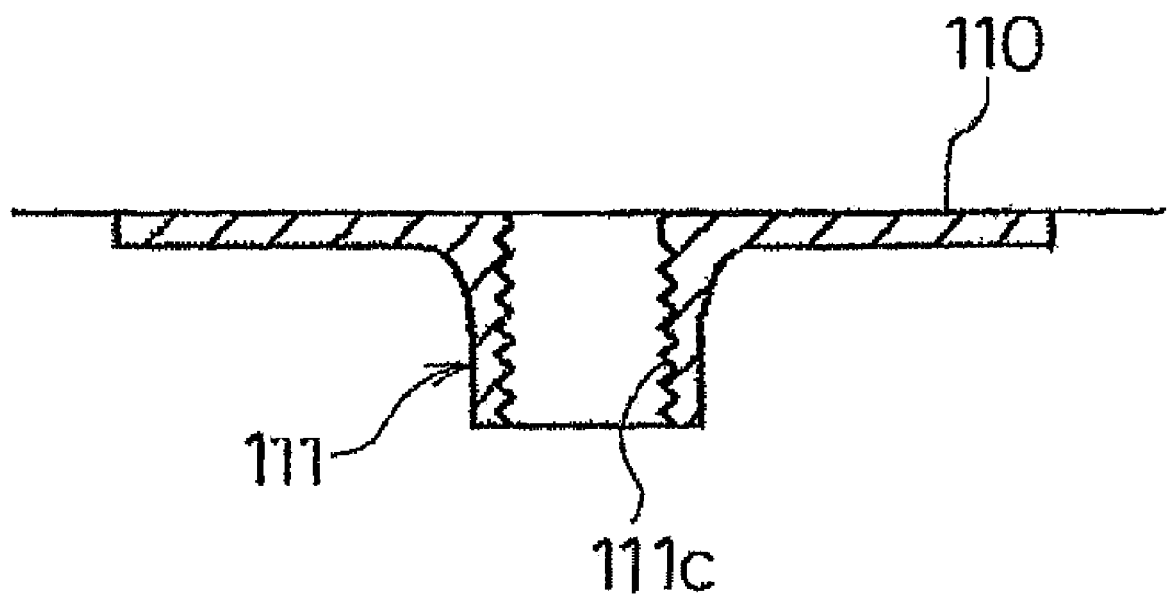
FIG. 14 is a cross-sectional view showing a workpiece shape after thread cutting processing.

The thread cutting process uses such a tap tool having a protrusion 13 provided at an end thereof as shown in FIG. 4 or FIG. 5. In the drawing, reference numeral 10 denotes a tap main body; 11, a shank portion; and 12, a tap processing portion using a thread cutting blade.

The protrusion 13 is used for forming a convex shape in a product, and it is a protrusion having a diameter 1 smaller than a diameter L of the tap processing portion 12 and formed at a central position of the tap processing portion 12 to protrude in an axial direction.

The protrusion 13 is formed at the end of the tap processing portion 12 through a step in an example depicted in FIG. 4, and the protrusion 13 is formed at the end of the tap processing portion 12 to provide an angular shape without a step in an example depicted in FIG. 5.

As taps of the tap tool, there are two types, i.e., taps for a through hole and a blind hole. In case of the tap for a though hole, as shown in FIG. 5, the tap can penetrate, an end of this tap is sharply tapered, and this tapered portion usually has an incomplete screw portion with four threads.

In case of the tap for a blind hole, as shown in FIG. 4, the tap stops along the way, an end depicted in FIG. 5 is cut to provide a flat shape (a trapezoidal shape), and a tapered portion usually has an incomplete screw portion with two threads.

Since the shape shown in FIG. 4 requires special processing, a cost is considerably increased, and the shape depicted in FIG. 5 is a standard type.

When this tap tool is inserted into the bag-like blind hole 14 at a planned part in the blind nut 2 to push a screw portion 14c obtained by tap processing, the protrusion 13 at the end of the tap tool main body 10 comes into contact with an inner wall 14a at the end of the bag-like blind hole 14, and a pressed material forms a convex shape 15 on an outer side of the bag-like blind hole 14.

Whether the formation of the screw portion 14c has been carried out even at an inner position by the tap processing in this manner can be readily judged by visually confirming that the convex shape 15 is formed.

In regard to a bending process, Z bending is carried out at a first step at P27 in FIG. 3, and final rough bending is performed at P29, thereby completing the bending.

A boring process is introduced in the process P31 depicted in FIG. 3 in order to assure a hole position accuracy and also assure a hole shape. That is because the hole is deformed or its position is shifted due to the drawing processing when the boring processing is carried out on an earlier stage.

Formation of the fitting that has a configuration where the portion corresponding to the fitting plate 1 is integrated with the blind nut 2 and that is utilized for hanging a TV main body on a wall is completed through cutting at P33.

What is claimed is:

1. A method for manufacturing a fitting including a blind nut, wherein said fitting has a configuration that a fitting plate and the blind nut are integrally formed so that said fitting is utilized for hanging a TV main body on a wall, and when forming a part of a plate material serving as the fitting plate into a bag-like blind hole by drawing processing and performing tap processing to an internal diameter portion to integrally form a portion corresponding to the blind nut, a tap tool having a protrusion at an end thereof is inserted into the bag-like blind hole at a planned part of the blind nut, and then carrying out the tap processing to form a continuous thread in the blind hole, thus allowing the protrusion provided at the end of the tap tool to come into contact with an inner wall at an end of the bag-like blind hole, and forming, with a material pressed thereby, a convex shape on an outer side of the bag-like blind hole.

2. A tap tool for use in a method for manufacturing a fitting including a blind nut, wherein said fitting has a configuration that a fitting plate and the blind nut are integrally formed so that said fitting is utilized for hanging a TV main body on a wall, and when forming a part of a plate material serving as the fitting plate into a bag-like blind hole by drawing processing and performing tap processing to an internal diameter portion to integrally form a portion corresponding to the blind nut, a tap tool having a protrusion at an end thereof is inserted into the bag-like blind hole at a planned part of the blind nut, and then carrying out the tap processing to form a continuous thread in the blind hole, thus allowing the protrusion provided at the end of the tap tool to come into contact with an inner wall at an end of the bag-like blind hole, and forming, with a material pressed thereby, a convex shape on an outer side of the bag-like blind hole; and wherein a protrusion is formed at an end of the tap tool to form a convex shape in a product.

3. The tap tool for use in a method for manufacturing a fitting including a blind nut according to claim 2, wherein a protrusion having a diameter smaller than a diameter of a tap processing portion is formed at an end of the tap processing portion of a tap main body formed of a shank portion and the tap processing portion so as to protrude in an axial direction.

* * * * *